Feb. 9, 1971 J. LOGRIPPO 3,562,373
METHOD OF MANUFACTURING PELLETS OF THERMO-PLASTIC MATERIAL
Filed March 6, 1969 2 Sheets-Sheet 1
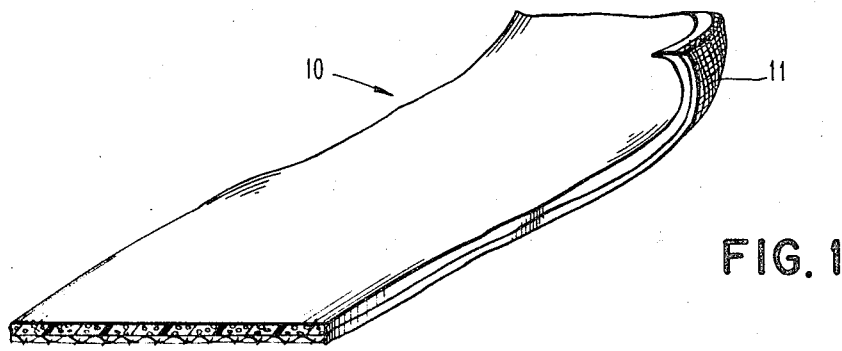
FIG. 1
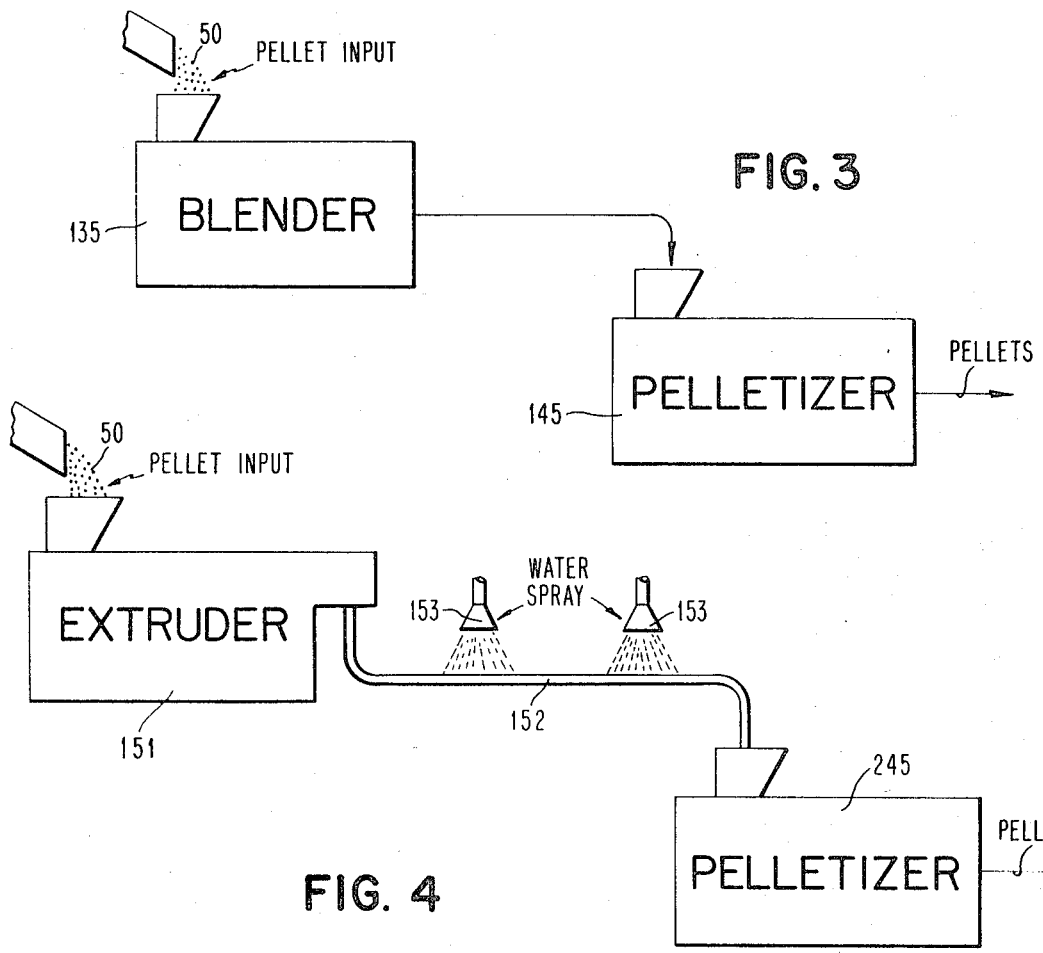
FIG. 3
FIG. 4
INVENTOR
JAMES LOGRIPPO
BY William J. Dick
ATTORNEY

United States Patent Office

3,562,373
Patented Feb. 9, 1971

3,562,373
METHOD OF MANUFACTURING PELLETS OF THERMOPLASTIC MATERIAL
James Logrippo, Norristown, Pa., assignor to Norristown Rug Manufacturing Company, Norristown, Pa., a partnership of Pennsylvania
Filed Mar. 6, 1969, Ser. No. 804,949
Int. Cl. B01j 2/00
U.S. Cl. 264—118
9 Claims

ABSTRACT OF THE DISCLOSURE

A method of manufacturing pellets for charging extruders, molds, etc. from fabric supported sheet vinyl. The supported sheet vinyl is typically a foamed waste which is chopped into a mass or mix of discrete particles. As the sheet vinyl supported foam is chopped, some fly is separated therefrom, and thereafter, as the discrete-sized particles are transported for storage purposes, additional fly is removed. The mix is then blended, the blending action causing heating due to mechanical agitation. Upon the blended mix reaching approximately 320° F., it attains a viscous mud-like consistency and is then spread out to permit cooling and then broken into rock-like chunks. Thereafter the chunk-like agglomerate is chopped to form pellets.

BRIEF DESCRIPTION OF THE INVENTION AND PRIOR ART

The present invention relates to a process of making thermoplastic pellets, and more particularly to a process for manufacturing pellets from waste vinyl supported sheet.

Supported sheet vinyl foam is normally manufactured by a rolling operation and pressing the support material, usually a sheet of cotton or rayon knit, or other yard goods into the hot vinyl sheet just prior to its being cooled so that the material is embedded in and adheres to the backside of the vinyl. In manufacturing large rolls in this manner, for example rolls 60 or more inches wide, it is common to cut the edges of the rolls so that the roll ends up being 54 to 56 inches wide. This leaves a selvage of from 4 to 6 inches. It is difficult and uneconomical to separate the cotton or rayon embedded in the back of the vinyl so that the vinyl in the selvage may be reprocessed. Alternatively remelting the vinyl selvage leaves the support material in the melt causing fouling of the processing apparatus and unevenness as well as a shabby appearance in the reprocessed vinyl sheet. Thus it is common practice to discard the selvage.

These have been numerous attempts to recapture the selvage formed as described above, by chopping the supported sheet vinyl and placing the chopped particles into, for example, an extruder and extruding for example a tube from the extruder. Although this has been partially successful, the tube formed has a lumpy, rough and uneven exterior as well as weak spots and pinholes in the wall of the tube. It has been discovered that the resulting poor product is caused by two things:

(1) A great deal of fly (fine chaff-like waste particles) is formed during the chopping operation, the fly tending to form lumps, and (2) The mix of chopped particles is not adequately blended and heated to cause an agglomerate to be formed. It has been found that even if the fly is not removed, adequate blending and heating forms an agglomerate that once pelletized makes satisfactory pellets which may be used for non-critical end products. However, reblending and heating of those pellets and subsequent pelletizing creates an even better pellet and a more acceptable end product produced therefrom. Additionally, removal of large quantities of fly during the process steps results in the formation of better pellets.

In view of the above, it is a principal object of the present invention to provide a novel process of forming pellets from supported sheet vinyl, which pellets may be utilized for charging extruders, molds, or for making sheet-like stock.

Another object of the present invention is to form pellets from waste supported sheet vinyl, either of the foamed or nonfoamed variety, by chopping the supported sheet vinyl foam, blending and heating the chopped supported foam until the particles form an agglomerate having a mud-like consistency, cooling the agglomerate and then granulating it so as to form pellets therefrom.

Still another object of the present invention is to remove from the chopped mix of discrete particles formed by chopping the supported sheet vinyl, a substantial quantity of the fly formed during the chopping operation.

Still another object of the present invention is to provide a process which permits the formation of pellets of varying homogeneity by progressive methods of reblending the pellets formed and regranulating the same.

A still further object of the present invention is to provide a process for manufacturing pellets of a uniform consistency or blend having short lengths of fibers dispersed through the pellets.

Other objects and a fuller understanding of the invention may be had by referring to the following specification and claims taken in conjunction with the accompanying drawings in which:

FIG. 1 is a fragmentary perspective view of a typical piece of fabric supported thermoplastic waste material utilized in forming pellets by the novel process of the present invention;

FIG. 3 is a schematic block diagram of a modification of the process of the present invention utilized in manufacturing pellets of a more uniform consistency; and FIG. 4 is a schematic block diagram of a further modification of the process of the present invention wherein pellets of extremely uniform size and consistency are desired.

Figure 2:
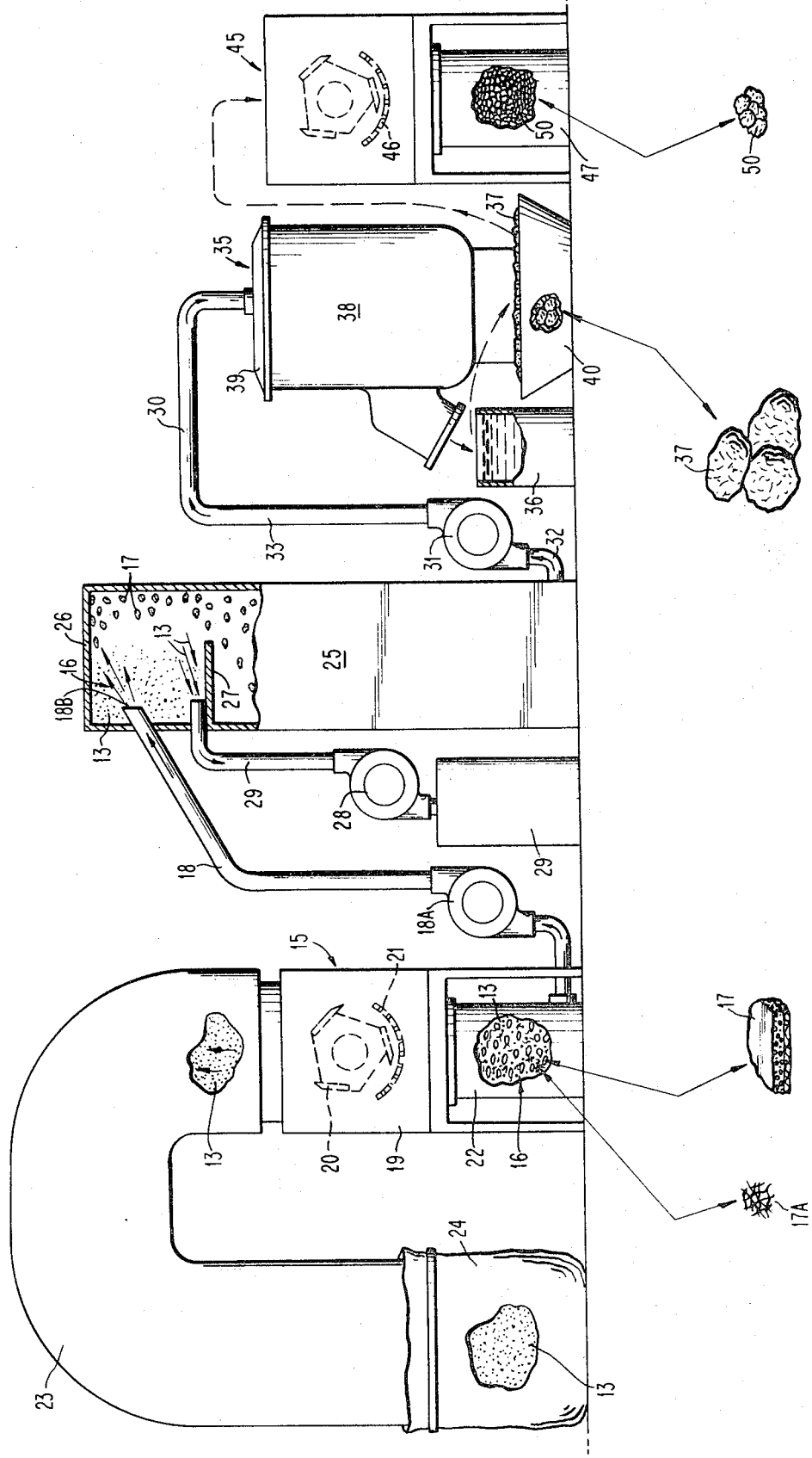
FIG. 2 is a fragmentary schematic diagram of apparatus used to manufacture the pellets in accordance with the process of the present invention.

Referring now to the drawings, and especially FIG. 1 thereof, a typical piece of supported sheet vinyl foam 10 having, in the illustrated instance, a fabric backing 11, is illustrated therein. The fabric backing 11, normally used in conjunction with thermoplastic material such as vinyl, is typically a knitted cotton or rayon. Conventionally the thermoplastic material includes compounds such as thermoplastic resins which have been treated with a compatible plasticizer. Generally the waste received contains a blowing or foaming agent such that the material has been foamed. Typically the thermoplastic is polyvinyl chloride sheet or tube having a plasticizer of the family of phthalate diesters and containing a nitrous or nitrogen foaming agent.

In accordance with the invention, the waste material above-described is processed to form a multi-purpose reinforced vinyl pellet which may be utilized in plastic processing machinery such as molding machinery utilized to mold toys, small parts, highway cone markers, etc.; extruding machinery to extrude tubing, etc. and rolling machinery to make reinforced vinyl sheet, etc. To this end, and referring first to FIG. 2, the sheet 10 is first chopped up or granulated in a granulator 15 to form a mix 16 of discrete particles 17, chopped yarn or fabric 17A, and fly 13 which particles, chopped fabric and fly 13 are then removed to a storage bin 25 as by pneumatic conveying system 18, in a manner to be described hereinafter. Thereafter, the particles are moved either by handcarrying or by pneumatic transport means 30 into a blender or mixer 35. The mix 16 of discrete particles is then mechanically agitated in the blender 35 until an agglomerate is formed, that is the material has joined together into a viscous mud-like consistency after which it is dumped into a container 36 and then spread out in bin 40 to cool after which time it is broken into chunks 37, the chunks then being placed into another granulator or pelletizer 45 which chops the chunks 37 into granules or pellets 50 useable for charging molds, extruders and the like for making a reinforced vinyl. In this context, it should be recognized that the term "chopping" includes cutting by any means.

The granulator 15 depicted schematically in FIG. 2 is commercially available from the Cumberland Engineering Co., Inc. of Pawtucket, R.I. and typically includes an upstanding base or foundation 19 in which is mounted rotary knives or blades 20 which turn against a porous screen 21 serving to cut the vinyl sheet into small particles and force it through the screen 21 into a container 22.

In accordance with one feature of the invention, as the supported vinyl has a fabric backing thereon, it was discovered that chopping up the sheet material into discrete particles causes a great deal of fly to be formed during the chopping operation, and utilization of pellets containing great quantities of fly in a lump condition cause the products formed from such pellets to contain weak spots, holes and other deformities which made the pellets not useable unless reprocessed, as will hereinafter be described. Therefore, it was discovered that it was desirable to remove as great a quantity of the fly as possible. Thus as the knives or blades 20 of the granulator 15 rotate at a high velocity, when they strike the sheet great quantities of fly and lint are formed, a quantity of which fly and lint may be easily removed as the air around the blades is highly turbulent, by providing a chimney 23 which leads into a bag or the like 24 into which is deposited the fly 13 formed as a result of the chopping or granulating action of the granulator 15. Thus the mix 16 in the container 22 has a large quantity of fly removed therefrom.

In order to remove still more fly from the mix prior to blending the same in the blender 35, the pneumatic conveyor 18 is provided with a blower 18A which serves to move the mix 16 and propel it into and against the upper terminal end 26 of the storage bin 25. Beneath the outlet end 18B of the conveyor piping 18 is a platform 26 which extends laterally across the storage bin while extending horizontally approximately ⅔ to ¾ of the distance across the bin. As the mix 16 impinges upon the upper terminal end 26 of the storage bin 25, the heavier particles 17 tend to be driven towards the rear of the bin and those particles fall through the opening defined intermediate the platform 27 and the upstanding side wall of the storage bin 25. These particles are collected in the portion of the storage bin beneath the platform 27 while the lighter fly, after impinging against the upper terminal end 26 tends to float down into the upper surface of the platform so that it may be removed. In this manner the amount of fly carried by the particles is further decreased.

To facilitate removal of the fly from the platform, a suction blower 28 may be provided with suitable piping 29 connected above the platform 27 and take a suction therefrom. In this manner, the fly 13 collected on the platform 27 may be conveniently removed therefrom and into a suitable container 29 for disposal.

Thereafter the mix 16 comprising the particles 17, chopped yarn 17A and some fly 13 collected at the bottom of the storage bin may be conveyed by any suitable means, for example the pneumatic transport means 30, into the blender or mixer 35, the pneumatic transport means 30 including a suction blower 31 and suitable intake and discharge piping 32 and 33 respectively. After the blender 35 has been charged with a suitable quantity of the mix 16, the blender or mixer is actuated so that the mix commences its blending step. It is noted at this time that the blender 35 may be of a commercial variety such as a Prodex-Henschel Blender Model #35 JSS made by the Prodex Corporation, Fords, N.J. As shown in FIG. 2, the blender or mixer 35 includes a vat 38 having a removable cover or lid 39 thereon. In the vat, and at the lower portion thereof, are blades or propellers (not shown) which when rotated throws the material or mix to the sides of the vat and up causing any fly remaining in the mix to move upwardly and float towards the lid 39. The lid 39 may be removed from the vat for the first 10 to 15 minutes of its operation permitting the fly to come up and float out of the vat. Thereafter the lid of the vat is closed and blending is continued until a temperature of between 295 and 340° F. is reached (preferably 320° F.–330° F.) at which time the mix is dumped into the container 36. It has been discovered that the mechanical agitation alone of the propellers against the material is sufficient to cause heating of the mass to extremely high temperatures. Accordingly, it is desirable that the temperature of the material be monitored such as by a thermocouple so that when the temperature arrives at its preferable point, i.e. 320° F.–330° F., the mix or agglomerate may be dumped into the container 36.

The hot agglomerate coming from the vat 38 has a consistency which is similar to that of thick mud, and is an intimate mixture of hot vinyl, short lengths of fiber or fabric, and some fly. The agglomerate is then dumped from the container 38 into a metal bin 40 and spread so as to permit the agglomerate to cool. The agglomerate is then broken into chunks or lumps 37 which are of the appearance of various size rubbery rocks. Thereafter, the contents of the pan 40 is dumped into the granulator or pelletizer 45 which may be of the same type as heretofore described relative to the granulator 15. As shown in FIG. 2, the chunks or lumps 37 of material, after being placed in the granulator, are ground into pellets 50, the size of which depends upon the size of holes in the screen 46. As shown, it is desirable to place a container 47 beneath the granulator so that as the chunks or lumps 37 are broken up by the granulator and the material is forced through the screen, the pellets thus formed by the novel method of the present invention may be collected for further processing or boxed for shipment.

It should be recognized that the pellets may be especially designed for whatever added use they are to be put, for example, while the mix is in the blender or mixer 35, a suitable plasticizer such as D.O.P. (dioctyl phthalate, a plasticizer made by Union Carbide under the name D.O.P.) and/or a plastisol resin such as QYKV (a plastisol resin sold by Union Carbide under name QYKV) may be added to the mix in proportion to whatever softness is desired in the end product. In addition, if additional hardness of the end product is desired, small pieces of unsupported vinyl may be added in any proportion desired, to the blender 35. Also, if a particular color is desired, the coloring agent should be added during the blending or mixing step.

It should be noted that after the rubbery-like chunks 37 are put in the granulator or pelletizer and are converted into pellets, the fine threads, yarn of fabric which initially had been chopped up by the granulator and are converted into pellets, are once again chopped up by the granulator or pelletizer making their lengths shorter and easier for the end user to process the pellets without jamming of the processing apparatus. However, the short lengths of threads, yarns, etc. in the pellets and in the final end product act as a binder giving stability and support to the material.

In certain instances it may be desirable to produce pellets of a more uniform consistency, the binding fiber serving to hold the pellet together being chopped into shorter lengths so that a more uniform or smoother surface on the finished article may be obtained. To this end, the pellets 50 may be taken from the container 47 and reblended, the blending operation being substantially that which has heretofore been described. As shown in FIG. 3 if the pellets 50 are placed in a blender 135, and the pellets are blended until a temperature of between 275 and 330° is reached, preferably approximately 320° F., the material may be removed in tis heated form, i.e. a mud-like consistency and spread out into a pan to cool, thereafter being broken into large lumps. In a manner as has heretofore been described, the lumps are then placed into a pelletizer or granulator 145, and pellets are once again made.

In certain instances where an extremely smooth surface is desired on the pellet, and a more uniform pellet size is desired, it has been discovered that pouring the pellets 50 into an extruder, the extruder being heated until a temperature of approximately 320°–330° F. is reached, extruding a tube or a solid cylinder which then may be subsequently cooled and then granulated to form a pellet of even more uniform consistency and size than as heretofore has been described. For example, as shown in FIG. 4 the pellets 50 are dumped into an extruder 151 and the material is heated in the extruder by well known methods until the material reaches the temperature of approximately 320° F.–330° F. Thereafter the material is extruded into continuous lengths 152 and water spray or beds, in the present instance a water spray cooling nozzle 153 being provided to cool the tube or other extrudate and it is moved into a pelletizer or granulator 245.

It should be apparent that a pelletizer will make a uniformly-sized pellet from a rod, but if a nonuniformly-sized pellet is acceptable, i.e. a pellet having an irregular contour, a typical granulator will accomplish the desired result.

It is important that the consistency of the agglomerate coming from the blender be similar to a hot, thick mud, regardless of the quantity of fly in the agglomerate. Typically, this will occur between 295° F. and 340° F., but normally between 320–330° F. For example, it has been discovered that even if large quantities of fly is not removed deliberately from the mix prior to the blending step, the subsequent blending and granulating will produce a pellet of nonuniform texture but which will still be useful in some applications where the finished article to be formed is not particularly critical. In addition, even in this instance, if a more uniform surface is desired for the subsequently molded or extruded article, it is desirable to follow the method shown in FIGS. 3 and/or 4 as above described, that is reblending and regranulating the pellets at least one more time and preferably two more times. However, for most purposes it is preferable to remove as much fly as possible as this will prevent weaknesses in wall thicknesses with thin-shelled or thin-walled molds and thin-walled tubes.

What is claimed is:
1. A method of manufacturing pellets from vinyl sheets having fabric backing attached thereto, comprising:
   (a) chopping said vinyl backed sheets into a particulate mixture of chopped vinyl, chopped fabric, lint and fly,
   (b) placing said mixture into a blender and heating said mixture to a viscous consistency,
   (c) discharging said hot viscous mixture from said blender and into a container to permit cooling of said mixture to a solidified mass,
   (d) breaking said solidified mass into chunks, and
   (e) chopping said chunks to form said manufactured pellets.
2. The method of claim 1 wherein a portion of said fly is separated from said mixture during said chopping step (a).
3. The method of claim 2 including, between steps (a) and (b), separating additional fly and lint from said mixture.
4. The method of claim 3 wherein air blowing is used in separating said fly and lint from heavier particles in said mixture.
5. The method of claim 1 wherein said mixture from said blender is spread out for cooling.
6. The method of claim 1 wherein said manufactured pellets are placed in a blender and heated to a viscous consistency, and thereafter treated according to the steps (c) through (e) of claim 1.
7. The method of claim 1 wherein said manufactured pellets are heated, continuously extruded and then chopped into pellets.
8. The method of claim 1 wherein said sheets are of vinyl foam.
9. The method of claim 1 wherein said heating of said mixture occurs by mechanical agitation.

References Cited

UNITED STATES PATENTS

| | | | |
|---|---|---|---|
| 2,887,725 | 5/1959 | Vickers et al. | 264—141 |
| 3,229,002 | 1/1966 | Feder | 264—126 |
| 3,278,661 | 10/1966 | Beck | 264—68 |
| 3,098,781 | 7/1963 | Greten | 264—121 |

ROBERT F. WHITE, Primary Examiner

J. R. HALL, Assistant Examiner

U.S. Cl. X.R.

264—37, 68, 121, 126